Sept. 9, 1958  J. MATTEAZZI ET AL  2,851,280
VEHICLE RUNNING GEAR WITH TRACKING FACILITATING MEANS
Filed May 18, 1954  3 Sheets-Sheet 1

INVENTORS
Jose Matteazzi and Marcos Brodsky
BY
Richards Geier
ATTORNEYS

Sept. 9, 1958     J. MATTEAZZI ET AL     2,851,280
VEHICLE RUNNING GEAR WITH TRACKING FACILITATING MEANS
Filed May 18, 1954     3 Sheets-Sheet 2
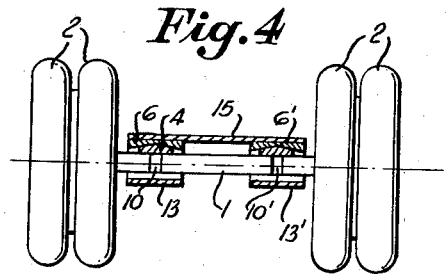
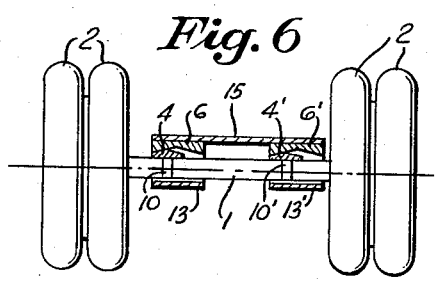
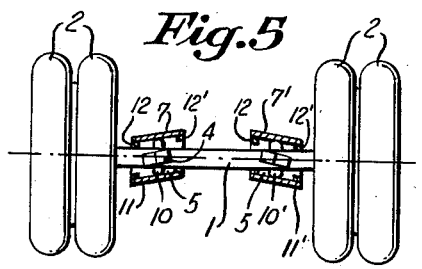
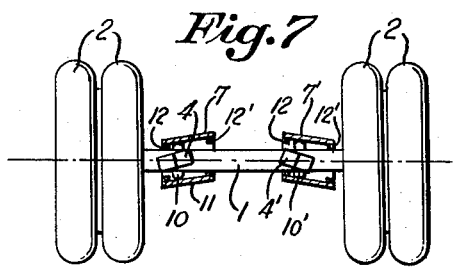
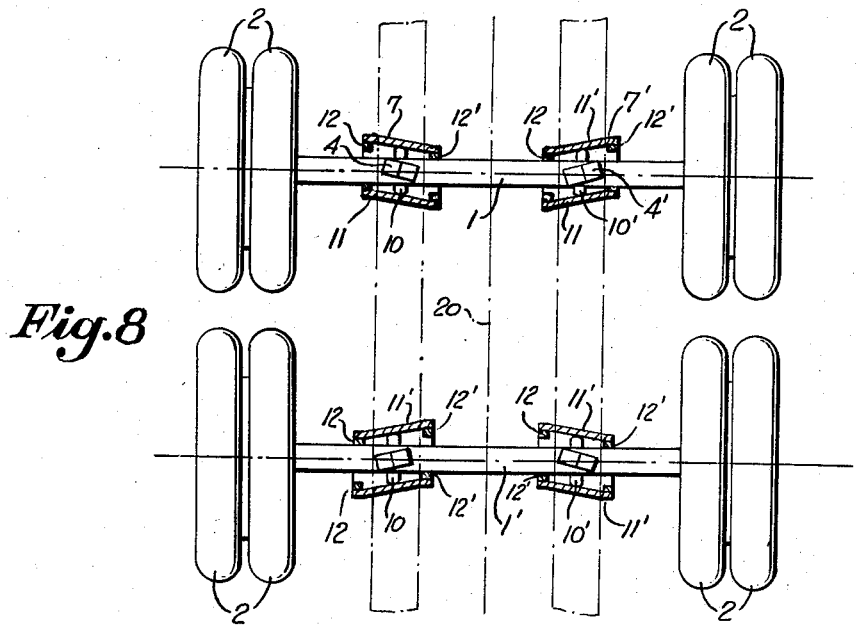
INVENTORS
Jose Matteazzi and Marcos Brodsky
BY
Richards & Geier
ATTORNEYS Sept. 9, 1958 J. MATTEAZZI ET AL 2,851,280
VEHICLE RUNNING GEAR WITH TRACKING FACILITATING MEANS
Filed May 18, 1954 3 Sheets-Sheet 3
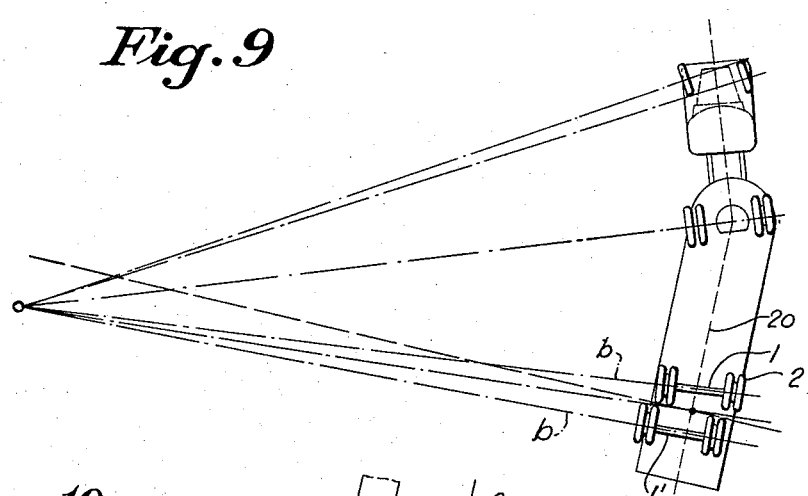
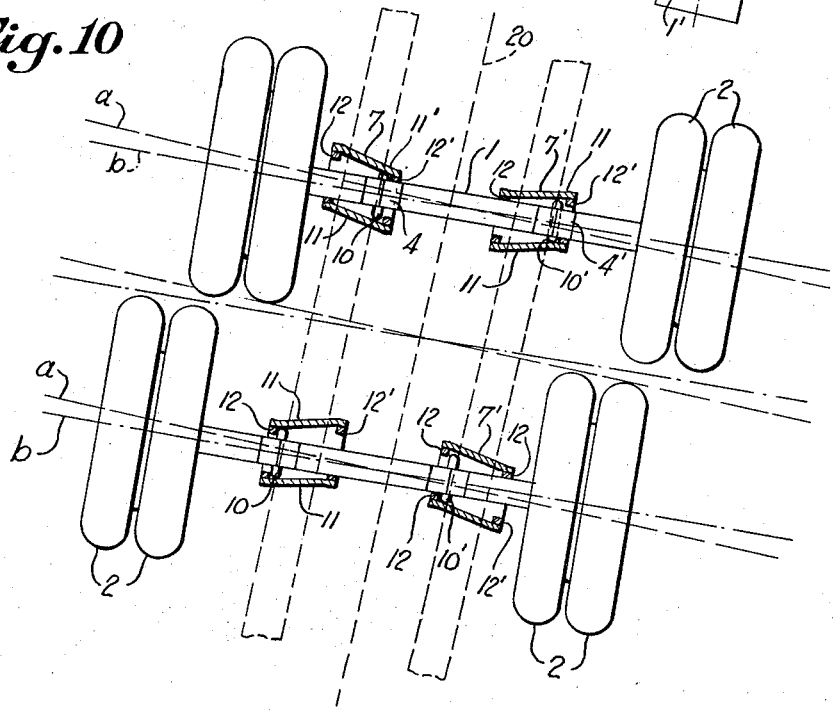
INVENTORS
Jose Matteazzi and Marcos Brodsky
BY
Richards & Geier
ATTORNEYS United States Patent Office 2,851,280
Patented Sept. 9, 1958

2,851,280
VEHICLE RUNNING GEAR WITH TRACKING FACILITATING MEANS

Jose Matteazzi and Marcos Brodsky,
Buenos Aires, Argentina

Application May 18, 1954, Serial No. 430,686

8 Claims. (Cl. 280—81)

The present invention refers to improvements in the mounting means for the chassis of trucks, trailers, semi-trailers and similar vehicles on the axles of the wheels.

In the above mentioned type of vehicles, designed for the transportation of heavy loads, it is inevitable that when same travel over a curved section of the road, the back group of wheels slide laterally, skidding with respect to the road surface. This affects the useful life of the tires considerably, not only by the compression of the tire but also due to the violent friction of the tread of the tire against the surface of the street or road as the case may be. In the case of trailers and semi-trailers said skidding is even more pronounced, since in the curves the wheels tend to rotate around the axis of coupling with the driving or pulling vehicle, that is to say, the tractor.

It is accordingly a primary object of the present invention to provide a robust and solid supporting means, of a positive functional efficiency for mounting the chassis of vehicles on the axles of the wheels, eliminating the deleterious effects of the "skidding" of the tires.

In general lines, the improvements claimed consist in the provision on the top part of the above mentioned axles, of at least one supporting piece, whose upper face forms a dihedral angle which is rather obtuse. The internal surface of the top of a box sits on the above mentioned supporting piece, this box being consolidated with the chassis of the vehicle, and being open at both ends. The above mentioned inside top surface also forms a dihedral angle similar to that of the supporting piece. It is evident, then, that the joint surfaces of both dihedral angles will allow an axial displacement of the axle on the curved stretches of the road, displacement which is guided and limited by two vertical projections disposed at either sides of the axle and by corresponding buffer elements provided at the lateral mouths or openings of the box, respectively.

The above mentioned box, whose enclosure extends at an angle to the axle which carries the wheels, is closed at its under part by a cover, rigidly secured to the free borders of its lateral walls, and furthermore is provided with lubricating means.

On vehicles provided with dual axles disposed parallel to one another, each one of the axles is provided with a pair of boxes displaced angularly with respect to the direction of the respective axle and oriented inversely on one axle with respect to the other, so that the displacement (angular) of the total of the four boxes converges towards the longitudinal axis of symmetry of the loading structure of the vehicle, within the zone comprised between the above mentioned dual axles of the latter.

The joining of the boxes to the loading structure of the vehicle is established through shock absorbers commonly fitted to the vehicle.

In accordance with the previous description, it is clear that when the vehicle with its trailer or similar contrivance travels along a stretch of road which is curved, the virtual prolonging of all the axles of the wheels will converge in the center of said curve, the improvements claimed permitting the axial displacement of same so as to avoid skidding of the vehicle. The axles with their corresponding wheels will reassume their normal alignment automatically, as soon as the vehicle gets on to a straight stretch of road.

In order that the present invention may be clearly understood and easily put into practice it has been presented in its preferable form of execution in the drawings which accompany this specification, and in which:

Figure 4 is a schematic front view, partially cut away or in section, of an axle and its wheels and in which the improvements, object of the present invention, have been included and shown in their normal disposition, that is to say, when the vehicle is travelling on a straight stretch of road.

Figure 5 represents an elevation view of the axle illustrated in the previous figure with its attached elements, in a partial cross-section in a horizontal plane.

Figure 6 illustrates the disposition of the elements of this invention, in relation to its representation in Figure 4, when travelling on a curved stretch of road.

Figure 7, similar to Figure 5, represents the disposition of the elements when the axial displacement of the axle of the vehicle has been produced.

Figure 8 represents in a partial horizontal cross-section, a view of the improved means of support, constructed in accordance with the invention, in the case of a vehicle provided with dual axles, disposed parallel to one another.

Figure 9 shows in a schematic form, the disposition adopted by the dual axles of a vehicle whose loading structure is joined to same in accordance with the invention, when same is running on a curved section of the road.

And lastly, Figure 10, similar to Figure 8, represents the disposition assumed by the supporting elements of the chassis of the conveyance, when the dual axles of same are displaced axially.

In all the above named figures, the same reference numbers and letters indicate equivalent parts.

Figure 1:
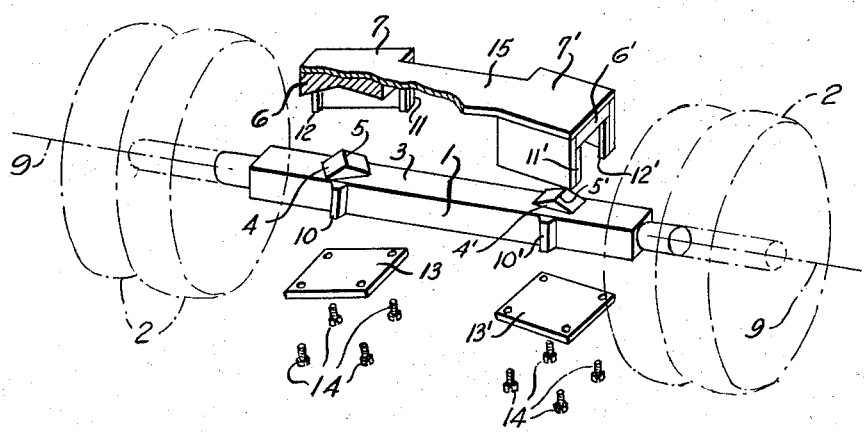
Figure 1 represents a perspective view of the axle of a vehicle which has the improvements pertaining to this invention.
Figure 2:
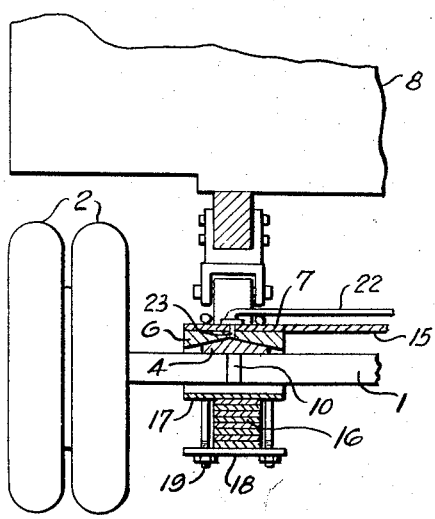
Figure 2 represents a front view of the end of an axle with its wheels, in which are disposed the supporting means of the chassis of a vehicle constructed in accordance with the invention.

The drawings show an axle 1 carrying the wheels 2 of a vehicle of the type mentioned and on the upper face 3 of said axle are symmetrically disposed towards both ends and forming an integral part of same, the two supporting pieces 4 and 4', similar to each other, the upper face of each one of which is formed by two inclined surfaces, forming a rather obtuse dihedral angle having an edge 5 and 5', respectively. On said supporting pieces the internal faces of the upper walls 6 and 6' of the corresponding boxes 7 and 7' sit, and are oriented in the direction of the above axle, being open at both ends and unitary with the chassis 8 of the vehicle (Figure 2). Each one of the walls 6 and 6' of said boxes forms at its internal face, corresponding dihedral angles similar to those of the supporting pieces 4 and 4', so that the conjugate surfaces of both parts in both pairs of dihedral angles permit an axial displacement of the axle 1, according to the dotted line 9 shown on Figure 1, for either one or the other sense of said displacement and which is of course produced, when the vehicle travels along a curved portion of the road.

The said axle 1 is provided on both sides at the level of the edges 5 and 5' of the dihedral angles of the pieces 4 and 4', with corresponding projections 10 and 10' which engage against the internal walls of the corresponding lateral sides 11 and 11' of the boxes 7 and 7', the said projections constituting the guiding means of the above mentioned axial displacement of the axle 1. The limitation of said displacement is given by the stops 12 and 12' provided on the free borders of the internal walls of said boxes, that is to say, at the lateral openings of the chamber which they define and which extends transversally of the axle 1.

Figure 3:
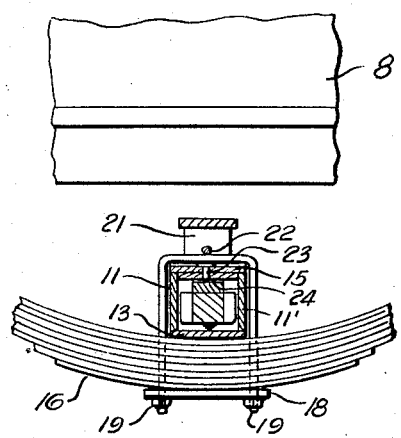
Figure 3 shows a lateral view of the device represented in the previous figure.

The boxes 7 and 7' are closed at their lower portions by a couple of covers 13 and 13' (Figures 1 and 4), firmly secured to the free edges or borders of their lateral walls 11 and 11' by means of screws 14, and said covers are disposed below the under face of axle 1. Both boxes are joined to one another by means of a joining member 15, clearly illustrated in Figure 1, at the same time the connection of the said boxes to the chassis 8 of the vehicle is established through the spring carrying shock absorber 16 of same, by means of the bracket or clamp 17, plates 18 and nuts 19 (Figures 2 and 3).

As may be seen in Figures 1, 5, 7, 8 and 10, the boxes 7 and 7' corresponding to the same axle of wheels, are angularly displaced with relation to the direction of same and extend, as far as the angular displacement is concerned, in an inverse sense of one box with respect to the other.

With regards to vehicles provided with dual axles carrying wheels, and disposed parallel and contiguously to one another (Figures 8 and 10), each one of said axles, numbered 1 and 1' in the above mentioned figures, has a corresponding pair of boxes 7 and 7', angularly displaced, so that the ends which face one another converge towards the longitudinal axis of symmetry 20 of the chassis 8 of the vehicle, within the zone comprised between the said dual axles.

In order to conveniently lubricate the conjugate surfaces of the dihedral angles of the supporting pieces 4 and 4' and the boxes 7 and 7', an oil container is placed over the joining member 15 which joins each pair of boxes corresponding to the same axle; said oil container 21 (Figures 2 and 3) feeds two opposite tubes 22 which terminate in respective perforations 23 made in the thickness of the above mentioned joining member 15. These perforations are disposed to coincide with an equal number of ducts 24 in the upper portion of each box at the edge of the dihedral angle which its internal face forms. It is therefore clear, that the outlet of the said ducts 24 is closed by the edges 5 and 5' of the dihedral angles of the supporting pieces 4 and 4' while the vehicle travels on straight stretches, whereas when same travels on a curved portion of the road, when the axial displacement takes place of the corresponding axle and wheels, the oil can flow freely lubricating the surfaces subjected to friction.

With the previous description of the constructive characteristics of the improvements, object of the present invention, it is easy to understand the working of same, which is as follows:

While the vehicle is traveling in a straight line, the proper weight of vehicle and load establishes the perfect centering of the chassis on the axles, since the dihedral angles of the internal surface of the top part of the boxes 7 and 7' engage their corresponding parts of the supporting pieces 4 and 4' unitary with said axles, preventing the displacement of these in either direction (Figures 4 and 5). When the vehicle travels on a curved section of the road, for instance, towards the left in the direction of travel (Figures 9 and 10), the semi-trailer tends to turn the two pairs of back wheels of the left side towards the outside of the curve, and this produces the relative axial displacement of the dual axles 1 and 1', the front one towards the outside of the curve and the rear one towards the interior or inside of same, increasing in this manner the stability of the conveyance. At the same time, it is to be noted that the said relative displacement of the axles is governed by the inclination of the lateral walls of the corresponding pairs of boxes 7 and 7'; this is equivalent to saying, with respect to the above mentioned Figures 9 and 10, that the axle 1 as well as the axle 1' are angularly displaced in the same sense, since as was stated above, the angular inclination of both pairs of boxes with respect to their respective axles is inverse, converging as a whole towards the center of the zone limited between both dual axles, and in such a manner that these latter move away from the normal a, assuming the direction b which converges towards the center c which coincides with the center of curvature at any given instant of the curve travelled by the vehicle, and by means of which the "skidding" or sliding of the tires on the surface of the road is entirely avoided, therefore also avoiding the consequent friction of the running rims of the tires on the road.

For the curves of minimum radius, it is well known that the relative axial displacement of the axles and wheels will be a maximum and in this case the stops or buffer members 12 and 12' provided in each of both pairs of boxes will be engaged and this action will be preponderant, whereas on the curves of greater radius the stops will not be reached practically, said stops constituting the limiting position.

It should be noted that at the same time that the relative axial displacement of the axles is produced, a slight elevation of the chassis of the vehicle is also produced (Figure 6), while its own weight tends to re-establish the normal position as soon as the determining forces of the displacement cease, that is, when the vehicle resumes its straight course.

The positive advantages of a practical, economic and functional order, which are the object of the present invention, have been made evident in the foregoing description, and it is needless to say that the example illustrated as a realization of same has been set forth by way of illustration and does not limit in any way, the scope of the invention which undoubtedly admits of various constructive modifications within the extent of the following claims.

What we claim is:

1. A chassis-axle construction for vehicles, said construction comprising: at least two knife edges mounted symmetrically on said axle with two downwardly inclined supporting surfaces on either side of said knife edge; said knife edges being divergent relatively to each other and extending in a horizontal plane at an acute angle to the longitudinal direction of the vehicle, a journal box for each knife edge; said box having bearing surfaces formed therein mating with and engaging said supporting surfaces; a joining member connecting said boxes; means guiding the lateral motion of said journal boxes at an angle to said axle; and lubrication means for lubricating said surfaces.

2. A chassis-axle construction as in claim 1 in which said lubrication means comprise: a receptacle fitted on said joining member containing oil, and from which lead corresponding tubes that feed respective perforations made in the thickness of said joining member; the above mentioned perforations being disposed to coincide with an equal number of ducts provided in the upper wall of each box at the level of the intersection of the bearing surfaces; said ducts being normally closed by the knife edge of the supporting piece, whereby the conjugate surfaces of the boxes and supporting pieces are lubricated.

3. Improvements in means supporting the chassis of vehicles on the axles of the wheels, comprising two axially spaced supporting pieces formed integrally with the axle, the upper face of each supporting piece having two inclined surfaces forming an obtuse dihedral angle, said angles being divergent and extending in a horizontal plane at an acute angle to the longitudinal direction of the vehicle; a separate box for each supporting piece, said boxes being open at both ends and unitary with the chassis of the vehicle; each box having an upper wall and lateral walls extending at an angle to the axle, the upper wall of each box having an inner surface engaging a separate supporting piece and forming a dihedral angle similar to that of the supporting piece, whereby said boxes and said supporting pieces are nested during straight ahead travel, the conjugate surfaces of both dihedral angles being capable of allowing an axial displacement of said axle with respect to the chassis on curved stretches of the travel of the vehicle, two pairs of vertical projections on said axle, the projections of each pair being located on opposite sides of the axle and being in alinement with the intersection of the planes of the dihedral angle of a separate supporting piece, said projections engaging the inner surfaces of the lateral walls of the boxes and constituting a guide for the axial displacement of said axle, and a joining member interconnecting said boxes.

4. Improvements in chassis-axle constructions as in claim 3, characterized in that the direction of the angular displacement of one of the said boxes is oriented in an inverse sense with respect to that of the other box.

5. A chassis-axle construction for vehicles to eliminate tire wear, said construction comprising two supporting pieces symmetrically positioned on the axle, each piece having downwardly inclined top surfaces forming an obtuse angle, said angles being divergent and extending in a horizontal plane at an acute angle to the longitudinal direction of the vehicle, a separate journal box for each supporting piece, each journal box being secured to the chassis and having a bearing block; each bearing block having surfaces mating with those of its supporting piece and in engagement therewith, whereby said boxes and said supporting pieces are nested during straight ahead travel, projections on the axle; each box having lateral walls extending at an angle to said axle, and stop pieces on the lateral walls engaging said projections to limit lateral motion of the chassis with respect to the axle, said angles extending in a horizontal plane, whereby the chassis maintains its horizontal planes during any lateral motion of the chassis with respect to the axle.

6. A chassis-axle construction as in claim 5 in which said journal boxes are joined by a top joining member, and slidably secured with respect to the axle by a lower cover plate, and made unitary with said chassis by shock absorbers.

7. A chassis-axle construction as in claim 5 for a vehicle having a longitudinal axis of symmetry in which each journal box has a longitudinal axis, the axes of the journal boxes intersecting at the axis of symmetry of the vehicle.

8. A chassis-axle construction as in claim 7 for dual axle trailers in which said point of intersection lies between the axles.

References Cited in the file of this patent
UNITED STATES PATENTS

| 1,423,002 | Mercier | July 18, 1922 |

FOREIGN PATENTS

| 560,080 | Great Britain | Mar. 20, 1944 |